US008495558B2

(12) United States Patent
Zito et al.

(10) Patent No.: US 8,495,558 B2
(45) Date of Patent: Jul. 23, 2013

(54) MODIFIER MANAGEMENT WITHIN PROCESS MODELS

(75) Inventors: Alanna Zito, Ottawa (CA); Alan Yeung, Kanata (CA); Steven Shaw, Ottawa (CA); Daniel Leroux, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 1348 days.

(21) Appl. No.: 12/018,713

(22) Filed: Jan. 23, 2008

(65) Prior Publication Data

US 2009/0187532 A1 Jul. 23, 2009

(51) Int. Cl.
*G06F 9/44* (2006.01)

(52) U.S. Cl.
USPC ......................................................... 717/104

(58) Field of Classification Search
USPC ......................................................... 717/104
See application file for complete search history.

(56) References Cited

U.S. PATENT DOCUMENTS

| | | | |
|---|---|---|---|
| 5,895,459 A * | 4/1999 | Enomoto | 706/10 |
| 7,191,429 B2 | 3/2007 | Brassard et al. | |
| 2003/0233655 A1 | 12/2003 | Gutta et al. | |
| 2004/0098744 A1 | 5/2004 | Gutta | |
| 2004/0216085 A1 | 10/2004 | Wilson et al. | |
| 2004/0237066 A1 | 11/2004 | Grundy et al. | |
| 2005/0071805 A1 | 3/2005 | Lauterbach et al. | |
| 2005/0261884 A1 | 11/2005 | Sakamoto et al. | |
| 2005/0262115 A1 | 11/2005 | Hu et al. | |
| 2005/0278691 A1 * | 12/2005 | MacPhee | 717/104 |
| 2006/0101376 A1 | 5/2006 | Gutz et al. | |
| 2006/0117037 A1 | 6/2006 | Gutz et al. | |
| 2007/0089104 A1 * | 4/2007 | Tal | 717/151 |
| 2007/0168383 A1 | 7/2007 | Fildebrandt et al. | |

OTHER PUBLICATIONS

Chen et al., "Toward a Semantic Anchoring Infrastructure for Domain-Specific Modeling Languages," ACM, 2005, 11pg.*
Merseguer et al., "Software Performance Modeling Using UML and Petri Nets," Springer-Verlag, 2004, 20pg.*
Robby et al., "Bogor: An Extensible and Highly-Modular Software Model Checking Framework," ACM, 2003, 11pg.*
Shonle et al., "XAspects: An Extensible System for Domain-Specific Aspect Language," ACM, 2003, 10pg.*
D'Souza, Desmond, et al., "First-Class Extensibility for UML-Packaging of Profiles, Stereotypes, Patterns", Lecture Notes in Computer Science, vol. 1723, p. 749,1999.
Carlson, David, "UML2 Profile for XML Schema Generation", XMLmodeling.com, Jul. 24, 2007.

* cited by examiner

*Primary Examiner* — Li B Zhen
*Assistant Examiner* — Ryan Coyer
(74) *Attorney, Agent, or Firm* — Novak Druce Connolly Bove + Quigg LLP

(57) ABSTRACT

A system for managing values associated with properties of elements within a process model can include a storage element for storing the process model and a processing element. The processing element can be configured to identify within the process model an element, to identify an object containing the element, to assign a value for a property of the element, and to retrieve the value for the property of element. The value for property of the element can be stored in location selected from one among an element modifier applied to the element, an object modifier applied to the object, a default set of values for the object, and a default set of values for the element, where the location for storing the value of the property of the element is selected such that the location has a higher relative priority than a location for storing a previous value for the property of the element.

20 Claims, 5 Drawing Sheets

MODIFIER MANAGEMENT WITHIN PROCESS MODELS

FIELD OF THE INVENTION

The present invention relates to the field of process modeling, and more particularly to management of modifiers during process modeling.

BACKGROUND

A typical method of generating a process model is by using a general-purpose modeling language that is not specific to any particular domain. However, when general-purpose modeling languages are used to define process models for particular domains, additional, domain-specific information is typically required for the model. Typically, domain-specific information is captured in a process model by applying modifiers to elements within the process model. The modifiers can provide additional properties for elements which were not defined for the element type in the modeling language. However, modifiers in general-purpose model languages have several limitations.

First, such modifiers are generally not dynamic, and the values specified by the modifiers typically need to be propagated across all elements associated with the modifier. This is generally a problem in situations where many elements have the same value for a property. For example, in the typical case where multiple elements in the process model are modified using the same modifier, general purpose languages typically require that any changes in the modifier be applied separately to all of these elements. Because the number of elements can be quite large in some process models, this is typically a large time-consuming and resource-consuming operation. Furthermore, such an approach generally cannot be efficiently scaled to deal with large process models having many modifiers and many properties defined in the modifiers.

Second, it is difficult to extend a modifier with new properties if there is no mechanism by which modifiers can be directly altered (which is often the case when modifiers are pre-defined in a general purpose modeling language). Typically, general-purpose modeling languages store a new property for an existing modifier in a profile by creating a second modifier in a second profile, which subclasses the original modifier and which can be used to replace the original profile. However, this approach still generally requires that the old modifier be unapplied and that the new modifier be applied on an element-by-element basis, which can be time-consuming if the process model is large or includes a large number of elements.

Alternatively, a new modifier that defines additional properties can be created without any relation to the original modifier and both modifiers can be applied to the applicable elements. However, such an approach typically requires going through the process model to apply this new modifier to existing elements. Furthermore, such an approach generally results in elements having at least two separate, unrelated modifiers for storing properties are in fact related to one another. Accordingly, any context that needs to know about the properties of a element needs to be additionally informed that the new modifier also contains properties associated with the profile, even though it is not associated in the process model to the profile or the original modifier.

Therefore, what is needed is a system and method for managing modifiers in process models that facilitate application of modifiers and extensibility of modifiers in large scale process models.

SUMMARY

In a first embodiment of the present invention, a method for retrieving values for properties of elements within a process model can include identifying an element, identifying an object containing the element, and retrieving a value for a property of the element. The retrieved value can be selected from values stored in a modifier applied to the element, in a modifier applied to the object, in a set of default values specified by the object, or in a set of default values specified by the element, and can be selected based on a relative priority of the element modifiers, the object modifiers, the set of object default values, and the set of element default values.

In a second embodiment of the present invention, a method for changing values associated with properties of elements within a process model can include identifying an element, identifying an object containing the element, and applying a new value to a property of the element. A new value can be selected from values stored in a modifier applied to the element, in a modifier applied to the object, in a set of default values specified by the object, or in a set of default values specified by the element, and can be selected based on a relative priority of the element modifiers, the object modifiers, the set of object default values, and the set of element default values.

In a third embodiment of the present invention, system for managing values associated with properties of elements within a process model can include a storage element for storing the process model and a processing element. The processing element can be configured to identify within the process model an element, to identify an object containing the element, to assign a value for a property of the element, and to retrieve the value for the property of element. A value can be selected from values stored in a modifier applied to the element, in a modifier applied to the object, in a set of default values specified by the object, or in a set of default values specified by the element, and can be selected based on a relative priority of the element modifiers, the object modifiers, the set of object default values, and the set of element default values.

DETAILED DESCRIPTION OF THE DRAWINGS

Embodiments of the present invention provide systems and methods for managing the values for properties of elements within objects of a process model. An object, as used herein, refers to a representation of a unit of a process model. For example, in a process model for a computer program, objects can be used to represent specific software objects within the computer program or the steps of the computer program. An element, as used herein, refers to the representation of a sub-unit of the object. For example, in a computer program, elements can be used to represent variables or subsections of code for a software object.

One aspect of the present invention is to use modifiers available in general purpose modeling languages to assign values to element properties and/or extend element properties and apply them to either objects or elements. Another aspect of the present invention is to provide priority rules for determining which of the values stored in these modifiers to apply to a specific element in an object. That is, embodiments of the present invention provide for using a hierarchical system for consistently determining which of the multiple default or modifier-specified values to apply to the properties of elements. For example, in the Unified Modeling Language (UML), values for properties can be stored using modifiers, such as stereotypes and profiles (a collection of stereotypes), which can be applied to objects or elements. Therefore, by using both modifiers applied objects or elements to extend properties of elements and/or to assign values for properties of elements, properties of elements within a single object can be modified with a single modifier, reducing the storage requirements and complexity of the process model can be reduced.

However, some modeling languages can also allow for values of properties of elements to be specified using default values included in objects and/or elements. That is, an element can include a set of properties and in some cases include values for such properties. Similarly, default object can also include a set of properties and/or values for such properties which are applied to any elements within the object. Therefore, in at least some embodiments, the priority rules can include handling of such default values. Accordingly, by using the priority rules, multiple values for a property of an element stored within multiple locations can be more easily managed.

Figure 1:
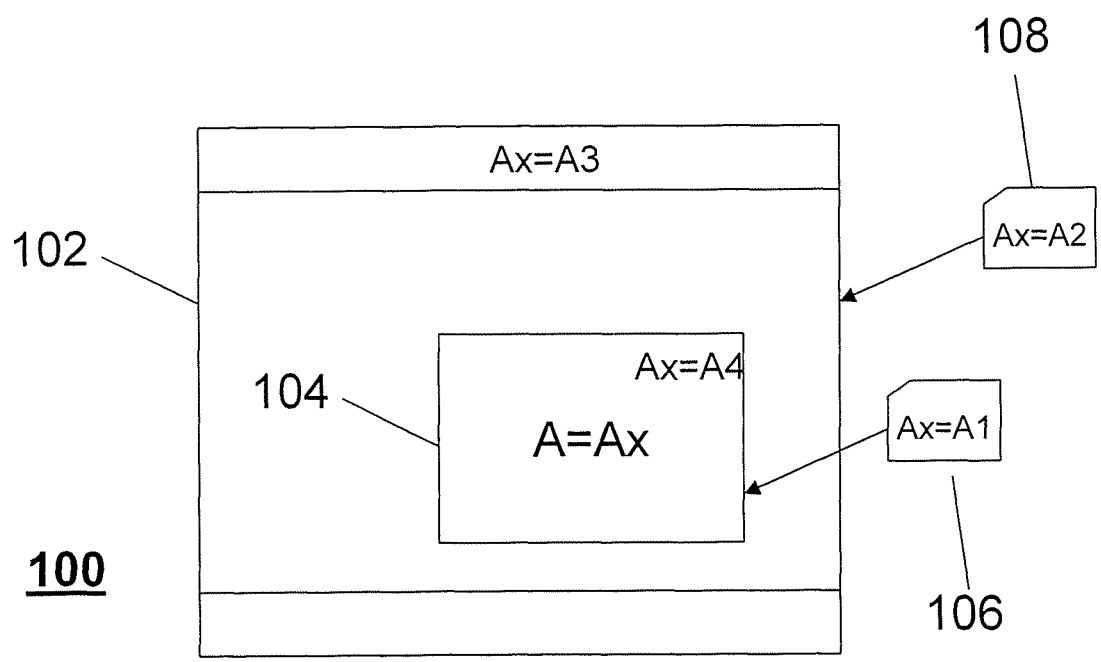
FIG. 1 is a schematic view of a process model having modifiers applied according to an embodiment of the present invention.

For example, as shown in FIG. 1, an exemplary process model can include at least one object 102 containing at least one element 104. The element 104 can include a property A with a value Ax. As shown in FIG. 1, the element 104 specifies a default value for Ax of A4. However, the object can also specify a default value for Ax of A3. Furthermore, a modifier applied to the element (element modifier) 106 and a modifier applied to the object (object modifier) 108 in the process model 100 can also specify values for Ax of A1 and A2, respectively. To deal with such process models, embodiments of the present invention can provide a set of priority rules to specify how to select from among A1, A2, A3, and A4.

For example the priority rules can specify that a higher priority can be assigned to values specified by modifiers. Furthermore, a higher priority can also be assigned to element modifiers. Consequently, the value in the element modifier 106, according to the priority rules, would be the highest priority modifier in the process model 100, resulting in a value of A1 for Ax. However, if the element modifier 106 was not present or did not specify a value for Ax, the value in the object modifier 108 can be used. Consequently, the value for Ax would be A2, the value specified in the object modifier 108. Similarly, if the object modifier 108 is not present in the process model 100 or does not specify a value for Ax, one of the default values in the element 104 or the object 102 can be used.

In the various embodiments, the use of default values can also be managed based on priority rules. For example, the priority rules can specify a higher priority for the object default value. Consequently, the element 104 can have a value for Ax of A3. However, if the object 102 does not specify a default value and no other modifiers are present, the default value of the element 104 can be used to provide a value for Ax of A4. As a result, the priority rules described above, as applied to FIG. 1, result in using the values, if present, in the following order: A1, A2, A3, and A4. However, this priority rule list is presented only by way of example, not by way of limitation. Accordingly, it is within the scope of the present invention to specify any set of priority rules for determining a value of a property of an element.

As used herein, the term "element modifier" refers to a modifier directly applied to an element. Similarly, the term "object modifier", as used herein, refers to a modifier directly applied to an object. However, the usage of such terms is not provided for purposes of limiting the scope of the present invention. The terms "object modifier" and "element modifier" are provided only for purposes of discussing the exemplary embodiments. In the various embodiments of the present invention, a particular modifier can be applied to either an object or an element. Therefore, the terms listed above are provided only for identifying in the discussion herein whether the particular modifier is being applied to an element or an object in the process model.

Figure 2A:
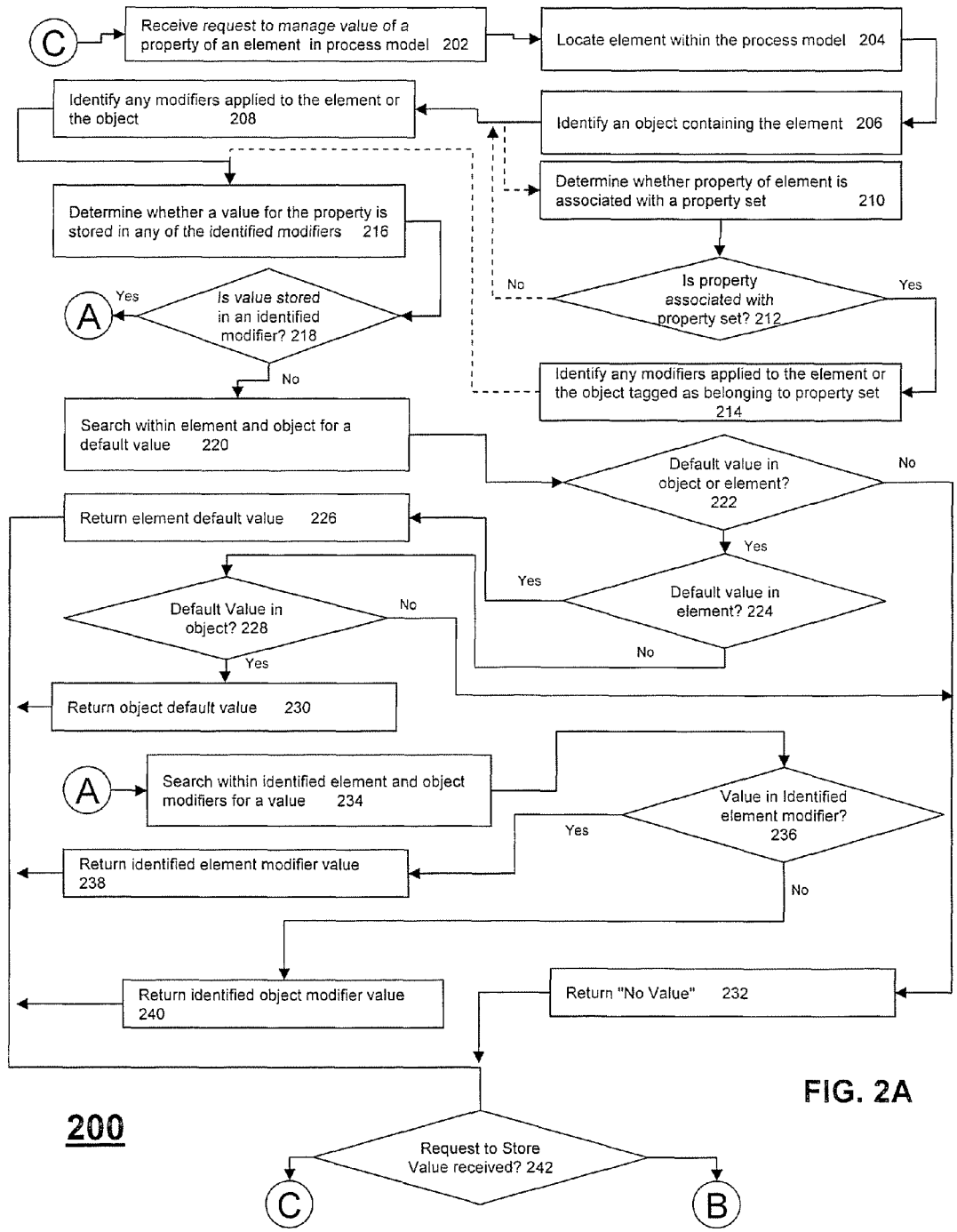
FIGS. 2A and 2B are a flowchart of steps in an exemplary method for managing properties of element in a process model according to an embodiment of the present invention.
Figure 2B:
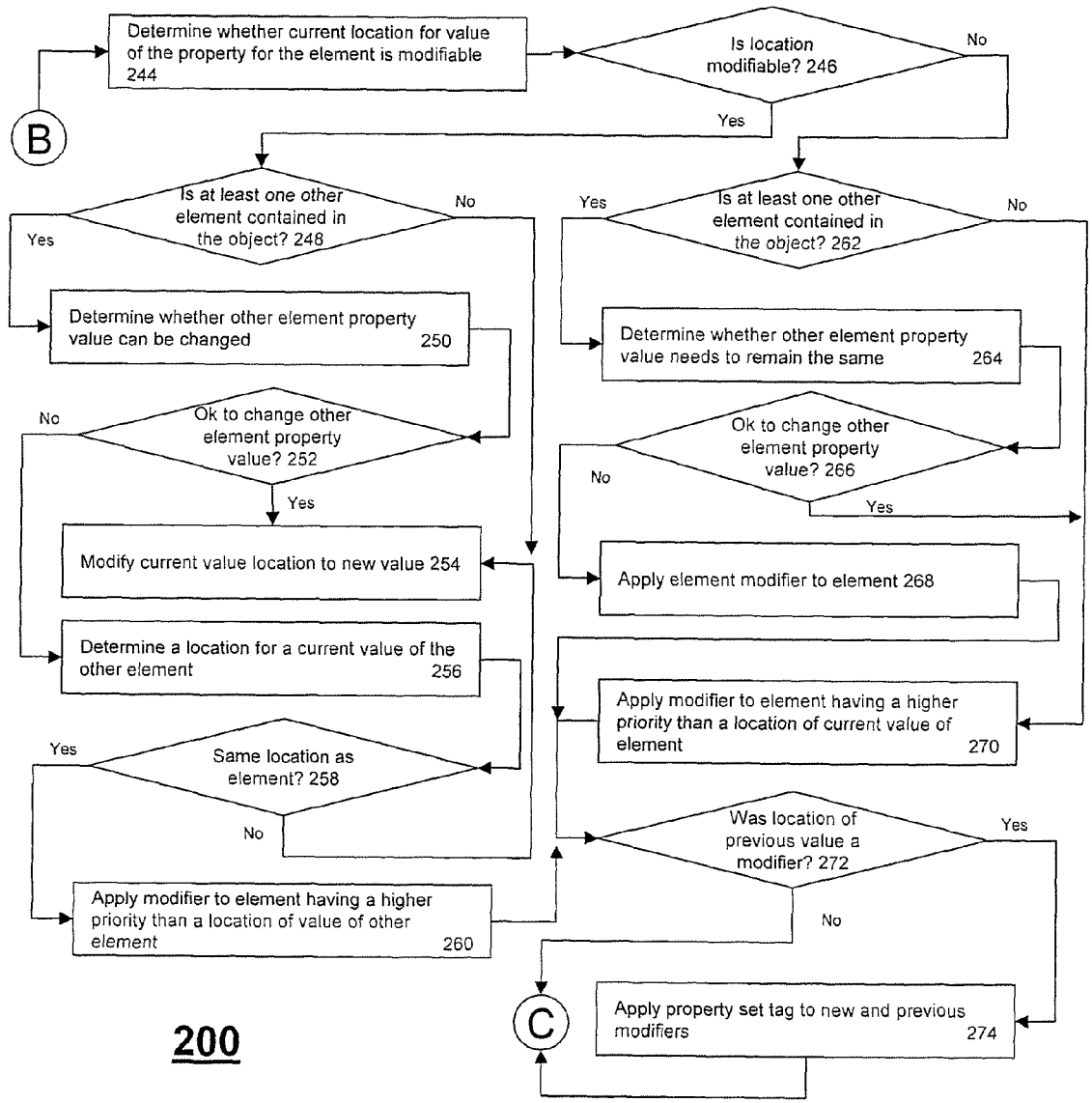

FIGS. 2A and 2B illustrate and exemplary method for managing values of elements in a process model according to an embodiment of the present invention. In step 202, a request can be received to manage a value of a property of an element in the process model. A request can include a request to retrieve or view a current value for a property of an element. Alternatively, the request can be received to modify an existing value for a property or even to add a new property and value for an element. Requests can be received during the generation of the process model or even during operation of the method represented in the model. Responsive to the received request, the element specified in the request can be located within the process model, as shown in step 204. Furthermore, in step 206, the object containing the element can also be identified. Once the element and object are identified and located, any modifiers currently applied directly to the object and/or the element can also be identified in step 208.

Another aspect of the present invention provides for tagging of modifiers. Using such tags, two or more modifiers can be associated with properties belonging to the same property set. This can be advantageous in cases where an existing modifier cannot be extended with new properties and a second modifier needs to be applied to the element. In such cases, in order to identify the modifiers as belonging to the same group, each modifier can be tagged to provide a common identifying tag. For example, a metadata tag can be applied to each modifier. Such tags can also be used to provide simpler identification names when the model language used requires a complex naming scheme for each of the modifiers used in the process model.

Accordingly, rather than retrieving all possible modifiers for an element or an object, as shown in step 208, the method 200 can instead provide for first determining whether the property in the request is associated with a particular property set in step 210. If the property is not associated with a property set in step 212, modifiers can be retrieved as previously discussed in step 208. However, if the property is associated with a property set in step 212, the method 200 can provide for identifying only those modifiers applied to the element or the object and which are commonly tagged as belonging to the set associated with the property in step 214.

Once the modifiers, elements, and objects are identified, the method 200 can determine if a value for the property is even specified in any of the modifiers in step 216. If no value is stored in step 218, the method 200 can search within the element and the object for a default value for the property in step 220. If a default value is found in step 222, then the priority rules for applying the default values can be used to determine which default value applies. For example, in the method 200, an element default value can have a higher priority than an object default value. Accordingly, the method 200 can first determine in step 224 whether a default value is specified in the element and return the stored element default value in step 226. If the element does not specify a default value in step 224, the method 200 can then determine in step 228 whether a default value is specified in the object and return the stored object default value in step 230. If neither the object nor the element specify a default value, the method 200 can respond to the request by stating that no value currently exists in step 232. Although, the method 200 specifies a higher priority for an element default value over an object default value, the invention is not limited in this regard. In other embodiments, the priority rules can specify that the object default value can have a higher priority than the element default value.

If a value for the property is stored in at least one of the identified modifiers, as shown in step 218, the method 200 can first determine in step 234 whether a value is stored within an element modifier or an object modifier. If a value is stored within an element modifier in step 236, the element modifier value can be returned in step 238. If the value is not stored in an element modifier in step 236, the value stored in the object modifier can instead be returned in step 240. Although, the method 200 specifies a higher priority for a value in an element modifier over a value in an object modifier, the invention is not limited in this regard. In other embodiments, the priority rules can specify that the object modifier value can have a higher priority than the element modifier value.

Although steps 202-240 illustratively describe a method for retrieving values of elements, embodiments of the present invention can also provide for storing values in accordance with the established priority rules. Accordingly, in step 242, the method 200 can provide for determining whether the received request was a request to retrieve a value or to apply a new value for a property of an element. In the case of retrieval of values, the method 200 is complete and can then start again with step 202 once another request is received.

Responsive to a request to store a value for a property of an element in step 242, the method 200, as shown in FIG. 2B, can determine whether the current location of the value is modifiable in step 244. Such a step can be necessary when using general purpose modeling languages do not allow the modification of certain modifiers. For example, values within certain pre-defined modifiers in UML are typically read-only. As a result, in some embodiments of the invention, a new or additional value for the property can instead be provided by applying an additional modifier to the element. However, the type of modifier to be used can vary according to the priority rules. Furthermore, even in cases where the location is modifiable, because other elements can be present in an object, modifying a value in a location can affect multiple elements. In cases where this is undesirable or contrary to the process model, embodiments of the present invention also provide for applying the new value using the priority rules.

After it is determined in step 246 that the location is modifiable, the method 200 in step 248 can determine whether at least one other element is contained within the object. If it is determined another object is within the object in step 248, the method 200 in step 250 can determine whether the value for the property can be changed. If the value can be changed or if no other elements are contained within the object, the current location can be modified to reflect the new value, in step 254.

However, if it is determined in step 252 that the value for the other element needs to remain unchanged, the method can first determine the location for the current value of the other element. Such a location can be determined using a method similar to that illustrated in steps 202-240 in FIG. 2A. Referring back to FIG. 2B, if the location of the value of the property for the element in the request and the other element are the same, in step 260 an element modifier can be applied to the element. For example, if values for both the elements are specified by an object default value or a value specified in an object modifier, an element modifier would be used to override these values. However, if the locations for the values are not the same, the current location can be modified in step 254.

If the location is determined not to be modifiable in step 246, the method can first determine whether at least other one element is contained in the object in step 262. If another element is contained in the object, the method 200 can determine in step 264 whether the value for the property in the other element needs to remain the same. If the method 200 determines in step 266 that the value needs to remain the same, an new element modifier can be applied to the element in step 268. If the value can be changed or if no other elements are contained within the object, any type of modifier having a priority higher than the current location of the value can be used in step 270. For example, for a value specified in an object default value, a new object modifier or element modifier can be applied to the element. In another example, if a non-modifiable element modifier is applied to the element, a new modifier element can be specified. In such embodiments, the priority rules can specify that newer modifiers have a higher priority than old modifiers. Alternatively, the priority rules can specify that modifiable modifiers have a higher priority than non-modifiable modifiers.

Figure 3:
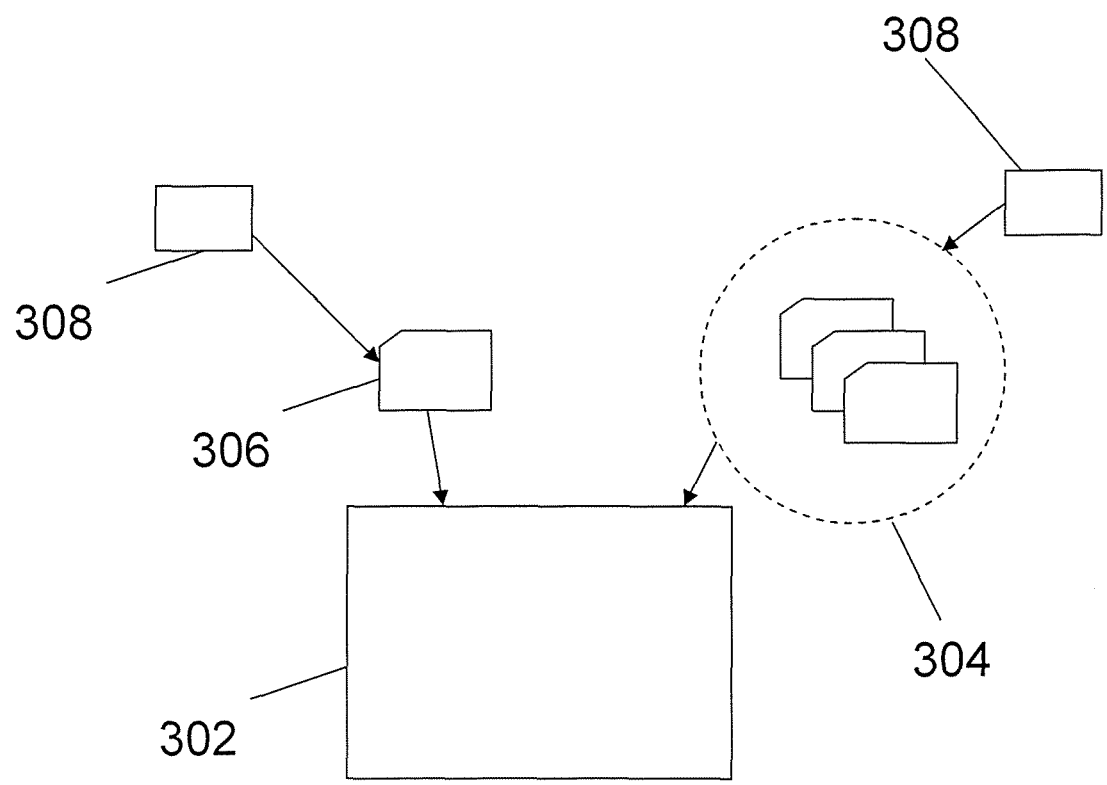
FIG. 3 is another schematic view of a process model having modifiers applied according to another embodiment of the present invention.

Regardless of how modifiers are applied to the process model, if the method 200 determines in step 272 that a new modifier was applied and that the location of the previous value was a different modifier, a property tag set can be applied to the new and existing modifiers to mark their association. For example, as shown in FIG. 3, if an a element 302 is modified using a set of modifiers 304 and the modifiers are non-modifiable, a new modifier 306 can be required to set the new value. In such cases, matching tags 308, 308 can be attached to modifiers 304, 306. The tags can contain information indicating that the modifiers are associated or otherwise related. Further the tags can be further configured to contain additional information, such as the portions of the property set contained in each of the modifiers. Referring back to FIGS. 2A and 2B, after the modifiers, if necessary, are tagged, the method can wait for another request and repeat steps 202-274.

Upon reviewing the aforementioned embodiments, it would be evident to one of ordinary skill in the art that the embodiments can be modified, reduced, or enhanced without departing from the scope and spirit of the claims described below. For example, in some embodiments, an element can be located within multiple nested objects. In such embodiments, the priority rules can be specified that specify any priority order for the default values specified in any of the nested objects or modifiers applied to the nested objects. For instance, in some cases the modifiers applied to certain objects have a higher priority than a modifier applied to the element. In other cases, default values in certain objects can have a higher priority than object modifiers in other objects.

Figure 4:
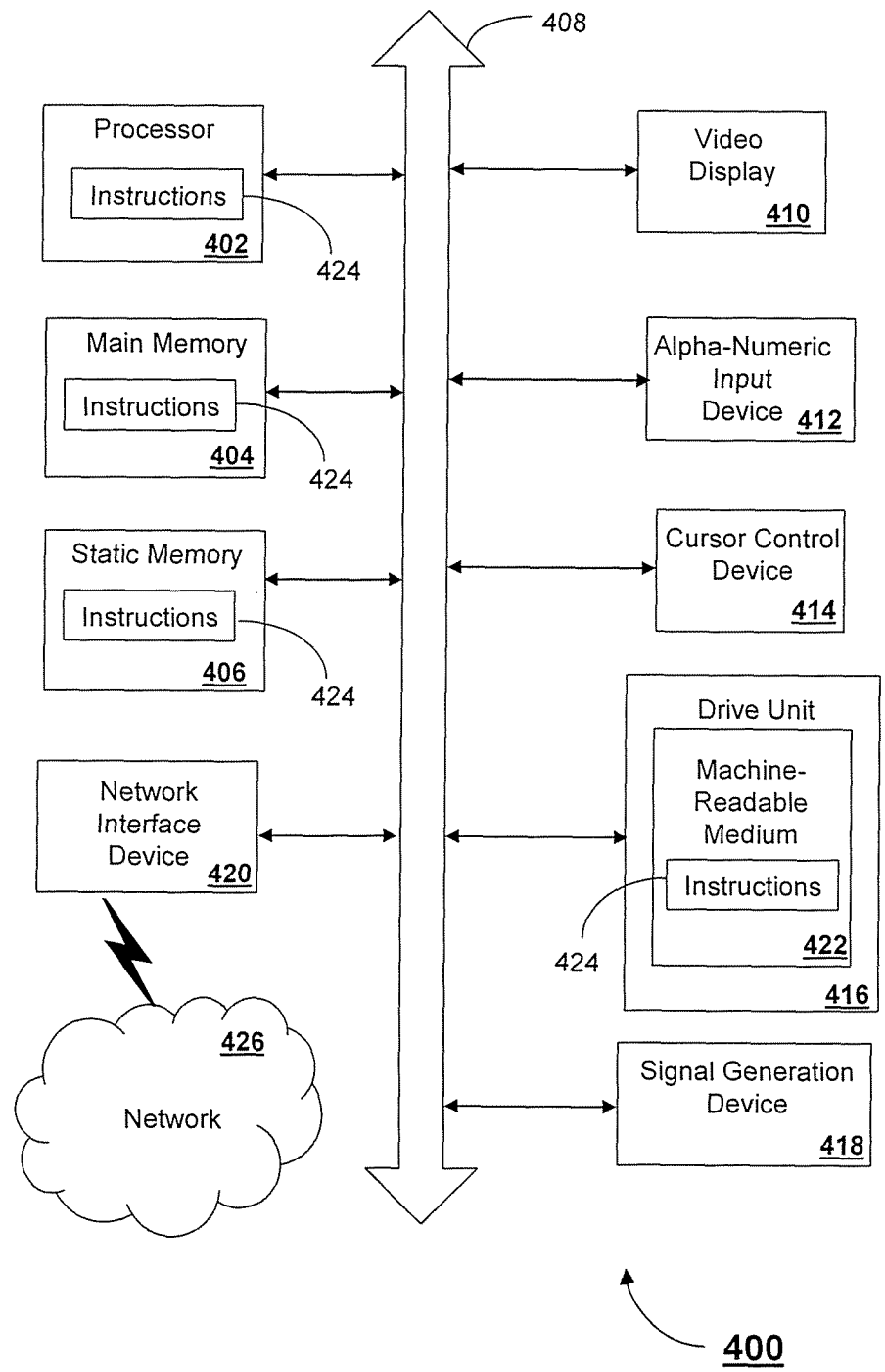
FIG. 4 is a schematic view of a computer system within which a set of instructions operate according to an embodiment of the invention.

FIG. 4 is a schematic diagram of a computer system 400 for executing a set of instructions that, when executed, can cause the computer system to perform one or more of the methodologies and procedures described above. In some embodiments, the computer system 400 operates as a standalone device. In other embodiments, the computer system 400 can be connected (e.g., using a network) to other computing devices. In a networked deployment, the computer system 400 can operate in the capacity of a server or a client developer machine in server-client developer network environment, or as a peer machine in a peer-to-peer (or distributed) network environment.

The machine can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 400 can include a processor 402 (such as a central processing unit (CPU), a graphics processing unit (GPU, or both), a main memory 404 and a static memory 406, which communicate with each other via a bus 408. The computer system 400 can further include a display unit 410, such as a video display (e.g., a liquid crystal display or LCD), a flat panel, a solid state display, or a cathode ray tube (CRT)). The computer system 400 can include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 can include a computer-readable storage medium 422 on which is stored one or more sets of instructions 424 (e.g., software code) configured to implement one or more of the methodologies, procedures, or functions described herein. The instructions 424 can also reside, completely or at least partially, within the main memory 404, the static memory 406, and/or within the processor 402 during execution thereof by the computer system 400. The main memory 404 and the processor 402 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present disclosure, the methods described herein can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

The present disclosure contemplates a computer-readable storage medium containing instructions 424 or that receives and executes instructions 424 from a propagated signal so that a device connected to a network environment 426 can send or receive voice and/or video data, and that can communicate over the network 426 using the instructions 424. The instructions 424 can further be transmitted or received over a network 426 via the network interface device 420.

While the computer-readable storage medium 422 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments can be utilized and derived therefrom, such that structural and logical substitutions and changes can be made without departing from the scope of this disclosure. Figures are also merely representational and can not be drawn to scale. Certain proportions thereof may be exaggerated, while others may be minimized. Accordingly, the specification and drawings are to be regarded in an illustrative rather than a restrictive sense.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method for retrieving values for properties of elements within a process model, the method comprising:

performing via one or more processors, the steps of:

identifying an element;

identifying an object containing the element; and retrieving a value for a property of the element to yield a retrieved value, wherein the retrieved value is selected from stored values available in element modifiers applied to the element, object modifiers applied to the object, a set of object default values specified by the object, and a set of element default values specified by the element, wherein the stored values available from the element modifiers, the object modifiers, the set of object default values, and the set of element default values has a relative priority with respect to each other according to a pre-defined set of priority rules for the process model for all of the elements, the set of priority rules specifying the relative priority between element modifiers and object modifiers, the relative priority between element default values and object default values, and the relative priority order for the element default values and the object default with respect to modifier values, and wherein the retrieving comprises selecting as the retrieved value a one of the stored values associated with the relative priority that is highest.

2. The method of claim 1, wherein the relative priority of the element modifiers and the object modifiers is greater than the relative priority of the set of object default values and the set of element default values.

3. The method of claim 2, wherein the relative priority of the element modifiers is greater than the relative priority of the object modifiers.

4. The method of claim 2, wherein the relative priority of the set of element default values is greater than the relative priority of the set of object default values.

5. The method of claim 1, wherein the set of priority rules specify:

selecting the value from the stored values in the set of object default values specified in the object unless there are stored values specified in at least one among the set of element default values specified in the element, the object modifiers, and the element modifiers, selecting the value from the stored values in the set of element default values specified in the element unless there are stored values specified in at least one among the object modifiers and the element modifiers, selecting the value from the stored values in the object modifiers unless there are stored values specified in the element modifiers, and selecting the value the stored values from the element modifiers when there are stored values in the element modifiers.

6. The method of claim 1, wherein the property is one of one or more properties in a property set, wherein values for the properties of the property set are stored using two or more of the element modifiers, two or more of the object modifiers, or at least one of the element modifiers and at least one of the object modifiers, wherein ones of the element modifiers and object modifiers used to store the values for the properties of the property set are commonly tagged, and wherein the step of retrieving further comprises:

selecting a the value of the property from the values stored in the tagged ones of the element modifiers and object modifiers.

7. The method of claim 1, wherein a possible value for the property of the element is stored in two or more object modifiers, and wherein the step of retrieving further comprises:

determining a type of the property of the element; and selecting the value for the property from the possible values by selecting a value stored in a one of two or more object modifiers having a tag associated with the type of the property of the element.

8. A computer-implemented method for changing values associated with properties of elements within a process model, the method comprising:

performing via one or more processors, the steps of:

identifying an element;

identifying an object containing the element; and applying a new value to a property of the element, wherein the new value is applied to the property of the element by storing the new value in a location having a higher priority than a location storing a current value of the property of the element, and wherein the location for the new value is selected from one among an element modifier applied to the element, an object modifier applied to the object, a set of object default values for the object, and a set of element default values for the element, wherein each of the element modifiers, the object modifiers, the set of object default values, and the set of element default values having a relative priority with respect to each other according to a pre-defined set of priority rules for the process model for all of the elements, the set of priority rules specifying the relative priority between element modifiers and object modifiers, the relative priority between element default values and object default values, and the relative priority order for the element default values and the object default with respect to modifier values.

9. The method of claim 8, wherein the relative priority of the element modifier and the object modifier is greater than the relative priority of the set of object default values and the set of element default values.

10. The method of claim 9, wherein the relative priority of the element modifier is greater than the relative priority of the object modifier.

11. The method of claim 9, wherein the relative priority of the set of element default values is greater than the relative priority of the set of object default values.

12. The method of claim 8, wherein the set of priority rules specify:

selecting the set of object default values for the object as the location unless a value for the property is specified in at least one among the set of element default values for the element, one or more existing object modifiers, and one or more existing element modifiers, selecting the set of element default values for the element for the location unless a value for the property is specified in at least one among the existing object modifiers and the existing element modifiers, selecting a new modifier applied to the object or one of the existing object modifiers for the location unless a value for the property is specified in the existing element modifiers, and selecting a new modifier applied to the element or one of the existing element modifiers as the location when a value for the property is specified in the existing element modifiers.

13. The method of claim 8, wherein the object contains at least one other element, and wherein the step of applying further comprises:

determining a location of the value of the property of the other element; and selecting the location for storing the new value such that the relative priority of the selected location is higher than the relative priority of the location of the value of the property of the other element.

14. The method of claim 8, wherein location for the property is at least one among a new object modifier and a new element modifier, wherein the property is associated with at least one other property located in at least one among an existing object modifier and an existing element modifier, and wherein the step of applying further comprises:

defining a property set including the property and the at least one other property;

tagging the location for the property and the location for the at least one other property with a common tag, the common tag specifying the defined property set.

15. A system for managing values associated with properties of elements within a process model, the system comprising:

at least one processor; and a computer-readable storage medium for storing the process model and for storing instructions for controlling the processor to perform steps comprising:

identifying within the process model an element, identifying an object containing the element, assigning a value for a property of the element, and retrieving the value for the property of element, wherein the value for property of the element is stored in a location selected from one among an element modifier applied to the element, an object modifier applied to the object, a set of element default values for the object, and a set of object default values for the element, wherein each of the element modifiers, the object modifiers, the set of object default values, and the set of element default values have a relative priority with respect to each other according to a pre-defined set of priority rules for the process model for all of the elements, the set of priority rules specifying the relative priority between element modifiers and object modifiers, the relative priority between element default values and object default values, and the relative priority order for the element default values and the object default with respect to modifier values, and wherein the assigning comprises selecting the location for storing the value of the property of the element is selected such that the location has a higher relative priority than a location for storing a previous value for the property of the element.

16. The system of claim 15, wherein the relative priority of the element modifier and the object modifier is greater than the relative priority of the set of object default values for the object and the set of element default values for the element.

17. The system of claim 15, wherein the set of priority rules specify:

selecting the set of object default values for the object as the location unless a value for the property is specified in at least one among the set of element default values for the element, one or more existing object modifiers, and one or more existing element modifiers, selecting the set of element default values for the element as the location unless a value for the property is specified in at least one among the existing object modifiers and the existing element modifiers, selecting a new modifier applied to the object or one of the existing object modifiers as the location unless a value for the property is specified in the existing element modifiers, and selecting a new modifier applied to the element or one of the existing element modifiers as the location when a value for the property is specified in the existing element modifiers.

18. The system of claim 15, wherein the object contains at least one other element, and wherein computer-readable medium further comprises instructions for controlling the processor to determine a location of the value of the property of the other element and to select the location for storing the new value such that the relative priority of the selected location is higher than the relative priority of the location of the value of the property of the other element.

19. The method of claim 15, wherein location for the property is at least one among a new object modifier and a new element modifier, wherein the property is associated with at least one other property located in at least one among an existing object modifier and an existing element modifier, and wherein computer-readable medium further comprises instructions for controlling the processor to define a property set including the property and the at least one other property and to tag the location for the property and the location for the at least one other property with a common tag, the common tag specifying the defined property set.

20. The system of claim 15, wherein the property is one of one or more properties in a property set, wherein values for the properties of the property set are stored using two or more of the element modifiers, two or more of the object modifiers, or at least one of the element modifiers and at least one of the object modifiers, wherein ones of the element modifiers and object modifiers used to store the values for the properties of the property set are commonly tagged, and wherein the processing element is further configured to select a the value of the property from the values stored in the tagged ones of the element modifiers and object modifiers.

* * * * *